United States Patent
Chen et al.

(10) Patent No.: US 10,329,464 B2
(45) Date of Patent: *Jun. 25, 2019

(54) TWO-PART ADHESIVE INCLUDING TOUGHENED CURATIVE

(71) Applicant: 3M INNOVATIVE PROPERTIES COMPANY, St. Paul, MN (US)

(72) Inventors: Lianzhou Chen, Woodbury, MN (US); Jay S. Schlechte, Oakdale, MN (US); George S. Stout, Maplewood, MN (US); Rachel J. Squires, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/548,922

(22) PCT Filed: Feb. 1, 2016

(86) PCT No.: PCT/US2016/015968
§ 371 (c)(1),
(2) Date: Aug. 4, 2017

(87) PCT Pub. No.: WO2016/137671
PCT Pub. Date: Sep. 1, 2016

(65) Prior Publication Data
US 2018/0030318 A1    Feb. 1, 2018

Related U.S. Application Data

(60) Provisional application No. 62/126,029, filed on Feb. 27, 2015.

(51) Int. Cl.
| | |
|---|---|
| *C08G 59/50* | (2006.01) |
| *C08G 59/20* | (2006.01) |
| *C09J 163/00* | (2006.01) |
| *C08G 59/18* | (2006.01) |
| *C08G 59/42* | (2006.01) |
| *C08L 63/00* | (2006.01) |

(52) U.S. Cl.
CPC .......... *C09J 163/00* (2013.01); *C08G 59/182* (2013.01); *C08G 59/184* (2013.01); *C08G 59/4253* (2013.01); *C08L 63/00* (2013.01)

(58) Field of Classification Search
None
See application file for complete search history.

(56) References Cited

U.S. PATENT DOCUMENTS

| | | | | |
|---|---|---|---|---|
| 5,229,438 A | * | 7/1993 | Ishida | C04B 26/14 523/428 |
| 7,223,820 B2 | | 5/2007 | Fischer | |
| 2006/0276601 A1 | * | 12/2006 | Lutz | C08G 18/10 525/528 |
| 2011/0048637 A1 | | 3/2011 | Kohli | |
| 2013/0217804 A1 | * | 8/2013 | Campbell | C08G 59/4007 523/400 |
| 2015/0184034 A1 | * | 7/2015 | Taniguchi | C09J 163/00 428/41.5 |
| 2018/0030319 A1 | * | 2/2018 | Chen | C08G 59/184 |

FOREIGN PATENT DOCUMENTS

| | | |
|---|---|---|
| EP | 2 135 909 | 12/2009 |
| EP | 2 223 966 | 9/2010 |
| EP | 2 468 792 | 6/2012 |
| GB | 1002454 | 8/1965 |
| JP | 4308893 | 10/1992 |
| JP | 11021335 | 1/1999 |
| JP | 2001-163954 | 6/2001 |
| WO | WO 2012/064717 | 5/2012 |
| WO | WO 2012/064724 | 5/2012 |
| WO | WO 2014/007963 | 1/2014 |
| WO | WO 2014/035655 | 3/2014 |
| WO | WO 2014/062895 | 4/2014 |

OTHER PUBLICATIONS

International Search Report for PCT/US2016/015968, dated May 6, 2016, 5 pages.

* cited by examiner

*Primary Examiner* — Michael J Feely
(74) *Attorney, Agent, or Firm* — Philip P. Soo

(57) ABSTRACT

A two-part adhesive is provided comprising: A) a curative part comprising: i) an epoxy curative; and ii) a reaction intermediate which is the reaction product of a suspension of core/shell rubber nanoparticles in a liquid epoxy resin and an excess of the epoxy curative; wherein the curative part comprises greater than 1.1 wt % core/shell rubber nanoparticles; and B) an epoxy part comprising: iii) a liquid epoxy resin; and iv) greater than 9.1 wt % core/shell rubber nanoparticles. In some embodiments, the epoxy part additionally comprises greater than 5.1 wt % solid epoxy resin, such as, e.g., triglycidyl ether of trisphenol-methane. In some embodiments, the sum of the wt % solid epoxy resin and the wt % core/shell rubber nanoparticles in the epoxy part is greater than 41.0%. In some embodiments, the sum of the wt % solid epoxy resin and the wt % core/shell rubber nanoparticles in the mixed adhesive is greater than 26.0%.

9 Claims, No Drawings

TWO-PART ADHESIVE INCLUDING TOUGHENED CURATIVE

CROSS REFERENCE TO RELATED APPLICATIONS

This application is a national stage filing under 35 U.S.C. 371 of PCT/US2016/015968, filed Feb. 1, 2016, which claims the benefit of U.S. Provisional Patent Application No. 62/126,029, filed Feb. 27, 2015, the disclosures of which are incorporated by reference in their entirety herein.

FIELD OF THE DISCLOSURE

This disclosure relates to two-part epoxy adhesives which achieve a higher loading of core/shell toughener and, in some embodiments, solid epoxy resin, yet which are readily formulated, mixed and handled, where the core/shell toughener is distributed between the curative and epoxy parts of the two-part adhesive.

BACKGROUND OF THE DISCLOSURE

The following references may be relevant to the general field of technology of the present disclosure: WO 2014/062895 A1, JP 2001-163954, U.S. Pat. No. 7,223,820, JP 4308893, JP 11021335, GB 1,002,454.

SUMMARY OF THE DISCLOSURE

Briefly, the present disclosure provides a two-part adhesive comprising: A) a curative part comprising: i) an epoxy curative; and ii) a reaction intermediate which is the reaction product of a suspension of core/shell rubber nanoparticles in a liquid epoxy resin and an excess of the epoxy curative; wherein the curative part comprises greater than 1.1 wt % core/shell rubber nanoparticles; and B) an epoxy part comprising: iii) a liquid epoxy resin; and iv) greater than 9.1 wt % core/shell rubber nanoparticles. In some embodiments, the curative part comprises greater than 6.1 wt % core/shell rubber nanoparticles. In some embodiments, the epoxy part comprises less than 23.8 wt % core/shell rubber nanoparticles core/shell rubber nanoparticles. In some embodiments, upon mixing of the curative par and the epoxy part to form a mixed adhesive, the mixed adhesive comprises greater than 11.1 wt % core/shell rubber nanoparticles. In some embodiments, the epoxy part additionally comprises greater than 5.1 wt % solid epoxy resin and in some embodiments greater than 26 wt % solid epoxy resin. In some embodiments, the solid epoxy resin is triglycidyl ether of trisphenol-methane. In some embodiments, the sum of the wt % solid epoxy resin and the wt % core/shell rubber nanoparticles in the epoxy part is greater than 41.0%. In some embodiments, upon mixing of the curative par and the epoxy part to form a mixed adhesive, the sum of the wt % solid epoxy resin and the wt % core/shell rubber nanoparticles in the mixed adhesive is greater than 26.0%. In some embodiments, the epoxy curative is an amine epoxy curative. Additional embodiments of the two-part adhesive of the present disclosure are described below under "Selected Embodiments."

In another aspect, the present disclosure provides a cured material that results from mixing the curative part with the epoxy part of any of the two-part adhesives according to the present disclosure and allowing cure. Additional embodiments of the cured material of the present disclosure are described below under "Selected Embodiments."

In this application:

"epoxy curative" means a compound, oligomer or polymer capable of reacting with an epoxy resin to form crosslinks, "epoxy resin" means a compound, oligomer or polymer having reactive epoxide functional groups;

"epoxy equivalent weight" of an epoxy resin means the weight of resin per epoxide functional group;

"functionality" of an epoxy resin means the number of epoxide functional groups per molecule;

"liquid epoxy resin" means an epoxy resin which in its uncured state is a liquid under standard temperature and pressure; and "solid epoxy resin" means an epoxy resin which in its uncured state is a solid under standard temperature and pressure.

DETAILED DESCRIPTION

The present disclosure provides a two-part adhesive comprising: a curative part ("Part A") comprising: i) an epoxy curative; and ii) greater than 1.1 wt % core/shell rubber nanoparticles; and an epoxy part ("Part B") comprising: iii) a liquid epoxy resin; and iv) greater than 9.1 wt % core/shell rubber nanoparticles; and in some embodiments, v) greater than 5.1 wt % solid epoxy resin.

Any suitable liquid epoxy resins may be used in the adhesive of this disclosure. Suitable liquid epoxy resins may include diglycidyl ethers of bisphenol F, low epoxy equivalent weight diglycidyl ethers of bisphenol A, liquid epoxy novolacs, liquid aliphatic epoxies, liquid cycloaliphatic epoxies such as, e.g., 1,4-cyclohexandimethanoldiglycidylether. Suitable liquid epoxy resins may include epoxy-functional species used as, or known as, reactive diluents.

Any suitable solid epoxy resins may be used in the adhesive of this disclosure. Suitable solid epoxy resins may include high epoxy equivalent weight diglycidyl ethers of bisphenol A, solid epoxy novolacs, and triglycidyl ether of trisphenol-methane. Typically the solid epoxy resin is triglycidyl ether of trisphenol-methane:

In some embodiments, core/shell rubber nanoparticles may be added to the epoxy part, the curative part, or both. Any suitable core/shell rubber nanoparticles may be used in the adhesive of this disclosure. In some embodiments, the core/shell rubber nanoparticles are added neat to the curative or epoxy parts of the present adhesive. In some embodiments, the core/shell rubber nanoparticles are introduced as a suspension of core/shell rubber nanoparticles in a liquid component of the curative or epoxy parts. Typically, in adding the core/shell rubber nanoparticles to the curative part, the suspension of core/shell rubber nanoparticles is first reacted with an excess of epoxy curative to form a reaction intermediate which is then used in the curative part. Typically, the core/shell rubber nanoparticles are introduced to the epoxy part as a suspension of core/shell rubber nanoparticles in a liquid epoxy. Suitable core/shell rubber nanoparticles may include cores of polybutadiene, butadiene/styrene copolymers, siloxanes, or the like, within a harder polymeric shell. In some embodiments, nanoparticles have an average diameter of 1-500 nm.

Any suitable epoxy curatives may be used in the adhesive of this disclosure. Suitable epoxy curatives may include amines, diamines, polyamines, polyamides, amidoamines, anhydrides, dicyandiamides, substituted ureas, thiols, phenolic curatives such as, e.g., diallyl bisphenol A, and the like.

In the practice of the present disclosure, it has been found that inclusion of core/shell rubber nanoparticles in the curative of the two-part adhesive allows higher loading of nanoparticles and optionally solid epoxy while preserving mixability of the adhesive, without which manufacture may become difficult or impossible, use (including the mixing of Parts A and B together) may become difficult or impossible, and the quality and consistency of results, such as strength of the adhesive bond, may suffer; in particular high temperature performance of the adhesive bond. Typically, a reaction intermediate is formed by reacting an excess of epoxy curative with a suspension of core/shell rubber nanoparticles in a liquid epoxy resin. The resulting reaction intermediate may then be added to the curative part.

Selected Embodiments

The following embodiments, designated by letter and number, are intended to further illustrate the present disclosure but should not be construed to unduly limit this disclosure.

1. A two-part adhesive comprising:
   A) a curative part comprising:
   i) an epoxy curative;
   ii) a reaction intermediate which is the reaction product of a suspension of core/shell rubber nanoparticles in a liquid epoxy resin and an excess of the epoxy curative; wherein the curative part comprises greater than 1.1 wt % core/shell rubber nanoparticles;
   and
   B) an epoxy part comprising:
   iii) a liquid epoxy resin; and
   iv) greater than 9.1 wt % core/shell rubber nanoparticles.
2. The two-part adhesive according to embodiment 1 wherein said curative part comprises greater than 2.1 wt % core/shell rubber nanoparticles.
3. The two-part adhesive according to embodiment 1 wherein said curative part comprises greater than 3.1 wt % core/shell rubber nanoparticles.
4. The two-part adhesive according to embodiment 1 wherein said curative part comprises greater than 4.1 wt % core/shell rubber nanoparticles.
5. The two-part adhesive according to embodiment 1 wherein said curative part comprises greater than 5.1 wt % core/shell rubber nanoparticles.
6. The two-part adhesive according to embodiment 1 wherein said curative part comprises greater than 6.1 wt % core/shell rubber nanoparticles.
7. The two-part adhesive according to embodiment 1 wherein said curative part comprises greater than 6.7 wt % core/shell rubber nanoparticles.
8. The two-part adhesive according to embodiment 1 wherein said curative part comprises greater than 7.1 wt % core/shell rubber nanoparticles.
9. The two-part adhesive according to embodiment 1 wherein said curative part comprises greater than 8.1 wt % core/shell rubber nanoparticles.
10. The two-part adhesive according to embodiment 1 wherein said curative part comprises greater than 9.1 wt % core/shell rubber nanoparticles.
11. The two-part adhesive according to any of embodiments 1-10 wherein said curative part comprises less than 49 wt % core/shell rubber nanoparticles.
12. The two-part adhesive according to any of embodiments 1-10 wherein said curative part comprises less than 39 wt % core/shell rubber nanoparticles.
13. The two-part adhesive according to any of embodiments 1-10 wherein said curative part comprises less than 29 wt % core/shell rubber nanoparticles.
14. The two-part adhesive according to any of embodiments 1-10 wherein said curative part comprises less than 19 wt % core/shell rubber nanoparticles.
15. The two-part adhesive according to any of embodiments 1-10 wherein said curative part comprises less than 14 wt % core/shell rubber nanoparticles.
16. The two-part adhesive according to any of embodiments 1-10 wherein said curative part comprises less than 9.7 wt % core/shell rubber nanoparticles.
17. The two-part adhesive according to any of embodiments 1-16 wherein said epoxy part comprises greater than 10.1 wt % core/shell rubber nanoparticles.
18. The two-part adhesive according to any of embodiments 1-16 wherein said epoxy part comprises greater than 11.1 wt % core/shell rubber nanoparticles.
19. The two-part adhesive according to any of embodiments 1-16 wherein said epoxy part comprises greater than 12.1 wt % core/shell rubber nanoparticles.
20. The two-part adhesive according to any of embodiments 1-16 wherein said epoxy part comprises greater than 12.4 wt % core/shell rubber nanoparticles.
21. The two-part adhesive according to any of embodiments 1-16 wherein said epoxy part comprises greater than 13.1 wt % core/shell rubber nanoparticles.
22. The two-part adhesive according to any of embodiments 1-16 wherein said epoxy part comprises greater than 14.1 wt % core/shell rubber nanoparticles.
23. The two-part adhesive according to any of embodiments 1-16 wherein said epoxy part comprises greater than 15.1 wt % core/shell rubber nanoparticles.
24. The two-part adhesive according to any of embodiments 1-16 wherein said epoxy part comprises greater than 16.1 wt % core/shell rubber nanoparticles.
25. The two-part adhesive according to any of embodiments 1-16 wherein said epoxy part comprises greater than 16.3 wt % core/shell rubber nanoparticles.
26. The two-part adhesive according to any of embodiments 1-16 wherein said epoxy part comprises greater than 16.6 wt % core/shell rubber nanoparticles.
27. The two-part adhesive according to any of embodiments 1-26 wherein said epoxy part comprises less than 23.8 wt % core/shell rubber nanoparticles.
28. The two-part adhesive according to any of embodiments 1-26 wherein said epoxy part comprises less than 22.9 wt % core/shell rubber nanoparticles.
29. The two-part adhesive according to any of embodiments 1-26 wherein said epoxy part comprises less than 21.9 wt % core/shell rubber nanoparticles.
30. The two-part adhesive according to any of embodiments 1-26 wherein said epoxy part comprises less than 20.9 wt % core/shell rubber nanoparticles.
31. The two-part adhesive according to any of embodiments 1-26 wherein said epoxy part comprises less than 19.9 wt % core/shell rubber nanoparticles.
32. The two-part adhesive according to any of embodiments 1-26 wherein said epoxy part comprises less than 19.5 wt % core/shell rubber nanoparticles.
33. The two-part adhesive according to any of embodiments 1-26 wherein said epoxy part comprises less than 18.9 wt % core/shell rubber nanoparticles.

34. The two-part adhesive according to any of embodiments 1-26 wherein said epoxy part comprises less than 17.9 wt % core/shell rubber nanoparticles.

35. The two-part adhesive according to any of embodiments 1-34 wherein, upon mixing of the curative par and the epoxy part to form a mixed adhesive, the mixed adhesive comprises greater than 11.1 wt % core/shell rubber nanoparticles.

36. The two-part adhesive according to embodiment 35 wherein the mixed adhesive comprises greater than 12.1 wt % core/shell rubber nanoparticles.

37. The two-part adhesive according to embodiment 35 wherein the mixed adhesive comprises greater than 13.1 wt % core/shell rubber nanoparticles.

38. The two-part adhesive according to embodiment 35 wherein the mixed adhesive comprises greater than 14.1 wt % core/shell rubber nanoparticles.

39. The two-part adhesive according to embodiment 35 wherein the mixed adhesive comprises greater than 15.1 wt % core/shell rubber nanoparticles.

40. The two-part adhesive according to embodiment 35 wherein the mixed adhesive comprises greater than 16.1 wt % core/shell rubber nanoparticles.

41. The two-part adhesive according to embodiment 35 wherein the mixed adhesive comprises greater than 16.6 wt % core/shell rubber nanoparticles.

42. The two-part adhesive according to any of embodiments 1-41 wherein, upon mixing of the curative par and the epoxy part to form a mixed adhesive, the mixed adhesive comprises less than 49.0 wt % core/shell rubber nanoparticles.

43. The two-part adhesive according to embodiment 42 wherein the mixed adhesive comprises less than 39.0 wt % core/shell rubber nanoparticles.

44. The two-part adhesive according to embodiment 42 wherein the mixed adhesive comprises less than 29.0 wt % core/shell rubber nanoparticles.

45. The two-part adhesive according to embodiment 42 wherein the mixed adhesive comprises less than 19.0 wt % core/shell rubber nanoparticles.

46. The two-part adhesive according to embodiment 42 wherein the mixed adhesive comprises less than 14.0 wt % core/shell rubber nanoparticles.

47. The two-part adhesive according to any of embodiments 1-46 wherein the epoxy part additionally comprises greater than 5.1 wt % solid epoxy resin.

48. The two-part adhesive according to any of embodiments 1-46 wherein the epoxy part additionally comprises greater than 11.0 wt % solid epoxy resin.

49. The two-part adhesive according to any of embodiments 1-46 wherein the epoxy part additionally comprises greater than 16.0 wt % solid epoxy resin.

50. The two-part adhesive according to any of embodiments 1-46 wherein the epoxy part additionally comprises greater than 21.0 wt % solid epoxy resin.

51. The two-part adhesive according to any of embodiments 1-46 wherein the epoxy part additionally comprises greater than 26.0 wt % solid epoxy resin.

52. The two-part adhesive according to any of embodiments 1-46 wherein the epoxy part additionally comprises greater than 31.0 wt % solid epoxy resin.

53. The two-part adhesive according to any of embodiments 1-52 wherein the epoxy part comprises less than 49.0 wt % solid epoxy resin.

54. The two-part adhesive according to any of embodiments 1-52 wherein the epoxy part comprises less than 44.0 wt % solid epoxy resin.

55. The two-part adhesive according to any of embodiments 1-52 wherein the epoxy part comprises less than 39.0 wt % solid epoxy resin.

56. The two-part adhesive according to any of embodiments 1-52 wherein the epoxy part comprises less than 34.0 wt % solid epoxy resin.

57. The two-part adhesive according to any of embodiments 47-56 wherein the sum of the wt % solid epoxy resin and the wt % core/shell rubber nanoparticles in the epoxy part is greater than 11.0%.

58. The two-part adhesive according to any of embodiments 47-56 wherein the sum of the wt % solid epoxy resin and the wt % core/shell rubber nanoparticles in the epoxy part is greater than 21.0%.

59. The two-part adhesive according to any of embodiments 47-56 wherein the sum of the wt % solid epoxy resin and the wt % core/shell rubber nanoparticles in the epoxy part is greater than 31.0%.

60. The two-part adhesive according to any of embodiments 47-56 wherein the sum of the wt % solid epoxy resin and the wt % core/shell rubber nanoparticles in the epoxy part is greater than 41.0%.

61. The two-part adhesive according to any of embodiments 47-56 wherein the sum of the wt % solid epoxy resin and the wt % core/shell rubber nanoparticles in the epoxy part is greater than 46.0%.

62. The two-part adhesive according to any of embodiments 47-61 wherein the sum of the wt % solid epoxy resin and the wt % core/shell rubber nanoparticles in the epoxy part is less than 69.0%.

63. The two-part adhesive according to any of embodiments 47-61 wherein the sum of the wt % solid epoxy resin and the wt % core/shell rubber nanoparticles in the epoxy part is less than 59.0%.

64. The two-part adhesive according to any of embodiments 47-61 wherein the sum of the wt % solid epoxy resin and the wt % core/shell rubber nanoparticles in the epoxy part is less than 54.0%.

65. The two-part adhesive according to any of embodiments 47-61 wherein the sum of the wt % solid epoxy resin and the wt % core/shell rubber nanoparticles in the epoxy part is less than 49.7%.

66. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is greater than 11.0%.

67. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is greater than 16.0%.

68. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is greater than 21.0%.

69. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is greater than 26.0%.

70. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is greater than 28.0%.

71. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is less than 59.0%.
72. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is less than 49.0%.
73. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is less than 39.0%.
74. The two-part adhesive according to any of embodiments 47-65 wherein, upon mixing of the curative par and the epoxy part to form a mixed adhesive, the sum of the wt % solid epoxy resin and the wt % core/shell rubber nanoparticles in the mixed adhesive is less than 34.0%.
75. The two-part adhesive according to any of embodiments 47-74 wherein the solid epoxy resin is triglycidyl ether of trisphenol-methane 76. The two-part adhesive according to any of embodiments 1-75 wherein the epoxy curative is an amine epoxy curative.
77. The two-part adhesive according to any of embodiments 1-76 wherein the curative part additionally comprises a poly-tetrahydrofuran amine toughener.
78. The two-part adhesive according to embodiment 77 wherein the curative part additionally comprises more than 4.1 wt % poly-tetrahydrofuran amine toughener.
79. An adhesive obtained by mixing the curative part with the epoxy part of any of the two-part adhesives according to any of embodiments 1-78.
80. A cured material that results from mixing the curative part with the epoxy part of any of the two-part adhesives according to any of embodiments 1-78 and allowing cure.

Objects and advantages of this disclosure are further illustrated by the following examples, but the particular materials and amounts thereof recited in these examples, as well as other conditions and details, should not be construed to unduly limit this disclosure.

EXAMPLES

The following abbreviations are used to describe the examples:
° F.: degrees Fahrenheit
° C.: degrees Centigrade
cm: centimeters
cm/min: centimeters per minute
Kg: kilograms
KPa: kilopascals
Kpsi: kilo pounds per square inch
MPa: megapascals
mil: 10-3 inches
mm: millimeters
mm/min: millimeters per minute
μm: micrometers
N-25 mm: Newtons per 25 millimeters
psi: pounds per square inch
wt. %: weight percent Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., USA, or may be synthesized by conventional methods. Unless otherwise noted, the terms "solid" and "liquid" as applied to an epoxy resin refer to the phase of the uncured resin under standard temperature and pressure, such as the phase reported for that resin in the manufacturer's MSDS.

ASP 200: hydrous aluminosilicates in very fine particles, obtained under the trade designation "ASP 200" from BASF Corporation, Ludwigshafen, Germany.

DEN-431: A liquid epoxy novolac resin which is a reaction product of epichlorohydrin and phenol-formaldehyde novolac, obtained under the trade designation "D.E.N. 431" from Dow Chemical Company, Midland, Mich., USA.

Epikote 232: A low-medium viscosity liquid epoxy resin consisting of a blend of a bisphenol A and a bisphenol F resin, obtained under the trade designation "EPIKOTE 232" from Momentive Performance Materials Holdings, LLC, Columbus, Ohio, USA.

Epodil 757: 1,4-Cyclohexandimethanoldiglycidylether, a cycloaliphatic difunctional (epoxy functional) reactive diluent, obtained under the trade designation "EPODIL 757" from Air Products and Chemicals, Inc., Allentown, Pa., USA.

E-828: liquid epoxy resin which is a diglycidyl ether of bisphenol A with an approximate epoxy equivalent weight of 187.5 grams/equivalent, obtained under the trade designation "EPON-828" from Hexion Specialty Chemicals, Houston, Tex.

FPL: An etch solution of sulfuric acid and sodium dichromate, obtained from Forest Products Laboratory, Madison, Wis., USA.

K54: A tertiary amine accelerator, obtained under the trade designation "ANCAMINE K54" from Air Products and Chemicals, Inc.

MX-257 A liquid epoxy resin which is a diglycidyl ether of bisphenol-A epoxy resin having an epoxy functionality of 2 which additionally contains 37.5 wt. % butadiene-acrylic co-polymer core shell rubber, having an approximate epoxy equivalent weight of 294 grams/equivalent, obtained under the trade designation "KANE ACE MX-257", from Kaneka Texas Corporation, Pasadena, Tex., USA.

MX-416: A liquid epoxy resin which is a multifunctional tetraglycidyl methylenedianiline (TGMDA) having an epoxy functionality of 4, which additionally contains 25 wt. % core shell rubber (CSR) toughener, having an approximate epoxy equivalent weight of 148 grams/equivalent, obtained under the trade designation "KANE ACE MX-416" from Kaneka Corporation.

NBDA: Norbornane diamine, obtained under the trade designation "PRO-NBDA" from Mitsui Fine Chemicals, Inc., Tokyo, Japan.

PolyTHF 1700: Poly-tetrahydrofuran amine 1700, a diamine of approximately 1700 average molecular weight based on a poly(tetra methylene ether)glycol, obtained under the trade designation "POLYTHF AMINE 1700" from BASF Corporation.

Tactix 742: A solid epoxy resin, triglycidyl ether of trisphenol-methane, obtained under the trade designation "TACTIX 742" from Huntsman Corporation, Salt Lake City, Utah, USA, which is a waxy solid at room temperature. (Physical State reported as "Solid. [Flakes.]" in TACTIX® 742 RESIN MSDS, Huntsman Corporation, Salt Lake City, Utah.)

TS-720: a synthetic, hydrophobic, amorphous silica produced via flame hydrolysis, obtained under the trade designation "CAB-O-SIL TS-720" from Cabot Corporation, Boston, Mass.

TTD: 4,7,10-trioxatridecane-1,13-diamine, obtained from BASF Corporation.

Vulcan XC-72R: a fluffy carbon black, obtained under the trade designation "VULCAN XC-72R" from Cabot Corporation, Boston, Mass., USA.

Z-6040 Silane: A bifunctional silane used as a coupling agent, obtained under trade designation "Z-6040 SILANE" from Dow Corning Corporation, Midland, Mich., USA.

Evaluations

Test Methods

Grade 2024T3 bare aluminum panels were obtained from Erickson Metals of Minnesota, Inc., Coon Rapids, Minn. Prior to bonding with structural adhesive, the panels were subjected to one of the following surface preparation processes:

Panel Preparation

FPL Etched/Anodized/Sol-Gel Primed Panels

The bare aluminum panel was soaked in OAKITE 165 caustic wash solution for 10 minutes at 85° C. The panel was then immersed in tap water for 10 minutes at 21° C., followed by a continuous spray rinsing with tap water for approximately 3 more minutes. The panel was then immersed in an FPL etch solution for 10 minutes at 66° C., after which the panel was spray rinsed with water for approximately 3 minutes at 21° C., allowed to drip dry for another 10 minutes, then dried in an oven for 30 minutes at 54° C. The etched panel was then anodized in a bath of 85% percent phosphoric acid at 72° F. (22.2° C.) for approximately 25 minutes at a voltage of 15 volts and a maximum current of 100 amps, rinsed with water for approximately 3 minutes at 21° C., allowed to drip dry for another 10 minutes, then dried in an oven for 10 minutes at 66° C. Within 24 hours of being anodized, the aluminum panel was primed with a corrosion inhibiting primer, available under the trade designation "SCOTCH-WELD STRUCTURAL ADHESIVE PRIMER, EW-5000" from 3M Company, according to the manufacturer's instructions. The dried primer thickness was between 0.1-0.2 mils (2.5-5.1 µm).

Approximately 4 grams of the Example were applied onto the end of a primed aluminum panel measuring 4 inches×7 inches×0.063 inches (10.16 cm×17.78 cm×0.16 cm). A second equally sized abraded and primed aluminum panel was then applied over the adhesive at an overlap of 0.5 inches (12.7 mm), and the assembly pressed between metal blocks at an approximate pressure of 2-5 psi (13.8-34.5 KPa).

The panel assembly was cured at 70° F. (21.1° C.) for 16 hours, followed by a post cure at 250° F. (121.1° C.) for 30-60 minutes, then cut into 1-inch by 7-inch (2.54 cm by 17.78 cm) strips. Overlap shear strength was measured according to ASTM D-1002, by means of a model "SIN-TECH-30" tensile tester, obtained from MTS Corporation, Eden Prairie, Minn., at a grip separation rate of 0.05 inches/minute (1.3 mm/min). Six test panels were prepared and evaluated per each example.

Floating Roller Peel (FRP) Strength Test

Two primed and etched aluminum panels, one measuring 63 mils by 8-inches by 3-inches (1.60 mm by 20.32 cm by 7.62 cm), the other measuring 25 mils by 10-inches by 3-inches (0.635 mm by 25.4 cm by 7.62 cm), were bonded together as described in the Overlap Shear Test above. Test strips, 0.5 inches (12.7 mm) wide were cut from the bonded panel assembly and evaluated for floating roller peel strength of the thinner substrate, according to ASTM D-3167-76, using a tensile strength tester, model "SIN-TECH 20" from MTS Corporation, at a separation rate of 6 inches/minute (15.24 cm/min) and at 70° F. (21.1° C.).

Results were normalized for 1-inch (2.54 cm) wide test strips. Five test panels were prepared and evaluated per each example.

Table III presents the results of Overlap Shear (OLS) testing conducted at 21° C. and at 121° C. and the results of Floating Roller Peel (FRP) testing conducted at 21° C. for Examples and Comparatives.

Examples 1 and 2 and Comparatives A and B

Example 1 and Comparative A

A batch of Example 1 part A (the curative part) was made as follows. 15.0 grams TTD, 30.0 grams NBDA and 25.00 grams PolyTHF 1700 were dispersed in a plastic cup by means of a high speed mixer operating at 2,200 rpm and 21° C. for 2 minutes then 1-2 minutes at 80° C. The mixture was allowed to cool to 21° C., after which 25.0 grams MX 257 (which includes core/shell particles) was dispersed by mixing at 2,200 rpm and 21° C. for 2-4 minutes, then 4-5 minutes at 80° C., before cooling back to 21° C. 3.1 grams K-54 and 2.0 grams calcium nitrate tetrahydrate were then added and mixed for approximately 4 minutes. Mixing continued until homogeneously dispersed.

A batch of Example 1 part B (the epoxy part) was made as follows. 10.0 grams DEN 431, 42.0 grams MX 257, 3 grams Epodil 757, 33.45 grams Tactix 742 (a waxy solid epoxy resin), 2 grams Z-6040 Silane and 8.0 grams Epikote 232 were homogeneously dispersed at 21° C. by means of the high speed mixer for 3 minutes at 2,200 rpm. Then 1.5 grams TS 720 and 0.05 grams Vulcan XC-72R were added to the mixture and the mixing continued at 2200 rpm until a homogeneous mixture was obtained.

Before testing, the mixed adhesive of Example 1 was made as follows. Example 1 parts A and B were mixed in a weight ratio of 1:1 by hand using a tongue dispenser or other mixing tools until homogeneously dispersed before testing.

Comparative A

An attempt was made to make a batch of Comparative A part B (the epoxy part) as follows. 10.0 grams DEN 431, 64.0 grams MX 257 (which includes core/shell particles), 3 grams Epodil 757, 33.45 grams Tactix 742 (a waxy solid epoxy resin), 2 grams Z-6040 Silane and 8.0 grams Epikote 232 were added to the same high speed mixer used in Example 1 at 21° C. It was found that the components would not mix or disperse due to very high viscosity. Comparative A was not completed, since Comparative A Part B could not be blended.

Compositions for Example 1 and Comparative A are summarized in Table I. Blank squares represent zero.

TABLE I (amounts in parts by weight)

|  | Ex. 1 Part A | Ex. 1 Part B | Ex. 1 Total | Comp. A Part B |
|---|---|---|---|---|
| Ca(NO$_3$)$_2$•4H$_2$O | 2.0 |  | 2.0 |  |
| DEN 431 |  | 10.0 | 10.0 | 10.0 |
| Epikote 232 |  | 8.0 | 8.0 | 8.0 |
| Epodil 757 |  | 3.0 | 3.0 | 3.0 |
| K-54 | 3.1 |  | 3.1 |  |
| MX 257 (includes 37.5 wt % core/shell) | 25.0 | 42.0 | 67.0 | 64.0 |
| NBDA | 30.0 |  | 30.0 |  |
| PolyTHF | 25.0 |  | 25.0 |  |

TABLE I-continued (amounts in parts by weight)

|  | Ex. 1 Part A | Ex. 1 Part B | Ex. 1 Total | Comp. A Part B |
|---|---|---|---|---|
| Tactix 742 (solid epoxy) |  | 33.45 | 33.45 | 33.45 |
| TS720 |  | 1.5 | 1.5 | 1.5 |
| TTD | 15.0 |  | 15.0 |  |
| Vulcan XC-72R |  | 0.05 | 0.05 | 0.05 |
| Z-6040 Silane |  | 2.0 | 2.0 | 2.0 |
| Wt % Core/shell | 9.4% | 15.8% | 12.6% | 19.7% |
| Wt % solid epoxy | 0.0% | 33.5% | 16.7% | 27.4% |
| Wt % Core/Shell + solid epoxy | 9.4% | 49.2% | 29.3% | 47.1% |

A comparison of Example 1 and Comparative A demonstrates that the compositions and methods according to the present disclosure allow a higher loading of core/shell particles and solid epoxy.

Example 2 and Comparative B

A batch of part A (the curative part) was made as follows. 9.45 grams TTD, 22.50 grams NBDA and 15.00 grams PolyTHF 1700 were dispersed in a plastic cup by means of a high speed mixer operating at 2,200 rpm and 21° C. for 2 minutes then 1-2 minutes at 80° C. The mixture was allowed to cool to 21° C., after which 11.9 grams MX 257 was dispersed by mixing at 2,200 rpm and 21° C. for approximately 2 minutes, then 4-5 minutes at 80° C., before cooling back to 21° C. 2.25 grams K-54 and 0.5 grams calcium nitrate tetrahydrate were then added and mixed for approximately 4 minutes, followed by 2.5 grams TS-720. Mixing continued until homogeneously dispersed.

A batch of part B (the epoxy part) was made as follows. 32.5 grams E-828, 32.5 grams MX-257 and 66.0 grams MX-416 were homogeneously dispersed at 21° C. by means of the high speed mixer for 3 minutes at 2,200 rpm.

Before testing, the mixed adhesive was made as follows. Part A and part B were mixed in the weight ratio of 2:1 by hand using a tongue dispenser or other mixing tools until homogeneously dispersed before testing.

Comparative B

A batch of part A was made as follows. 8.4 grams TTD, 23.5 grams NBDA and 15.0 grams PolyTHF 1700 were dispersed in a plastic cup by means of a high speed mixer operating at 2,200 rpm and 21° C. for 2 minutes then 1-2 minutes at 80° C. The mixture was allowed to cool to 21° C., after which 7.5 grams E-828 was dispersed by mixing at 2,200 rpm and 21° C. for approximately 2 minutes, then 4-5 minutes at 80° C., before cooling back to 21° C. 1.5 grams K-54 was then added and mixed for approximately 4 minutes, followed by 1.0 grams TS-720 and another 4 minutes of mixing. Finally, 2.5 grams ASP 200 was added and mixing continued until homogeneously dispersed.

A batch of part B was made as follows. 25.0 grams E-828, 40.0 grams MX-257 and 66.0 grams MX-416 were homogeneously dispersed at 21° C. by means of the high speed mixer for 3 minutes at 2,200 rpm.

Before testing, the mixed adhesive was made as follows. Part A and part B were mixed by the ratio of 1:2 by hand using a tongue dispenser or other mixing tools until homogeneously dispersed before testing. Mixing of Comparative B required significantly greater effort and duration vis a vis Example 2.

Compositions for Example 2 and Comparative B are summarized in Table II. Blank squares represent zero.

TABLE II (amounts in parts by weight)

|  | Ex. 2 Part A | Ex. 2 Part B | Ex. 2 Total* | Comp. B Part A | Comp. B Part B | Comp. B Total* |
|---|---|---|---|---|---|---|
| ASP 200 |  |  |  | 2.5 |  | 2.8 |
| Ca(NO$_3$)$_2$•4H$_2$O | 0.5 |  | 0.5 |  |  |  |
| E-828 |  | 32.5 | 32.5 | 7.5 | 25.0 | 33.3 |
| K-54 | 2.25 |  | 2.30 | 1.5 |  | 1.7 |
| MX 257 (includes 37.5 wt % core/shell) | 11.9 | 32.5 | 44.7 |  | 40.0 | 40.0 |
| MX-416 (includes 25 wt % core/shell) |  | 66.0 | 66.0 |  | 66.0 | 66.0 |
| NBDA | 22.50 |  | 23.0 | 23.5 |  | 25.9 |
| PolyTHF | 15.0 |  | 15.3 | 15.0 |  | 16.5 |
| TS720 | 2.5 |  | 2.6 | 1.0 |  | 1.1 |
| TTD | 9.45 |  | 9.66 | 8.4 |  | 9.3 |
| Wt % Core/shell | 7.0% | 21.9% | 16.9% | 0.0% | 24.0% | 16.0% |

*2:1 weight ratio of part B to part A.

Evaluation results for Examples and Comparatives are summarized in Table III.

TABLE III

| Examples/ Comparatives | OLS at 21° C. (psi/MPa) | OLS at 121° C. (psi/MPa) | FRP at 21° C. (piw/N-25 mm) |
|---|---|---|---|
| Example 1 | 4305/29.7 | 1626/11.2 | 22.4/98.1 |
| Comparative A | Not measurable | Not measurable | Not measurable |
| Example 2 | 4893/33.7 | 2683/18.5 | 14.6/63.9 |
| Comparative B | 4247/29.3 | 1824/12.6 | 15.2/66.5 |

A comparison of Example 2 and Comparative B demonstrates that the compositions and methods according to the present disclosure allow better mixability of parts A and B while maintaining a high loading of core/shell particles. Improved overlap shear performance, particularly at high temperature (121° C.), may be attributed in part to more speedy and complete mixing. Applicants note that a comparison of Examples 1 and 2 demonstrate the trade-off between FRP and high temperature OLS performance. In general, a more rigid cured adhesive material will demonstrate improved high temperature OLS at the cost of FRP performance.

Various modifications and alterations of this disclosure will become apparent to those skilled in the art without departing from the scope and principles of this disclosure, and it should be understood that this disclosure is not to be unduly limited to the illustrative embodiments set forth hereinabove.

We claim:

1. A two-part adhesive composition comprising:
   A) a curative part comprising: i) an epoxy curative; and ii) a reaction intermediate;
   wherein the reaction intermediate ii) is a reaction product of a suspension of core/shell rubber nanoparticles in a liquid epoxy resin and an excess of the epoxy curative;
   wherein the core/shell rubber nanoparticles are present in an amount of greater than 1.1 wt % and less than 49 wt % of the curative part; and
   B) an epoxy part comprising: iii) at least one liquid epoxy resin; and iv) core/shell rubber nanoparticles or a suspension of core/shell rubber nanoparticles in a liquid epoxy resin;
   wherein the at least one liquid epoxy resin iii) is distinct from the liquid epoxy resins of ii) and iv);
   wherein the core/shell rubber nanoparticles are present in an amount of greater than 9.1 wt % and less than 23.8 wt % of the epoxy part; and
   wherein the curative part A) and the epoxy part B) are provided in a mixing ratio such that when mixed, the core/shell rubber nanoparticles of A) and B) are present in a combined amount of greater than 11.1 wt % and less than 49 wt % of the two-part adhesive composition.

2. The two-part adhesive composition according to claim 1 wherein the core/shell rubber nanoparticles of the curative part A) are present in an amount of greater than 6.1 wt % and less than 49 wt % of the curative part.

3. The two-part adhesive composition according to claim 1 wherein the epoxy part B) further comprises a solid epoxy resin, wherein the solid epoxy resin is present in an amount of greater than 5.1 wt % and less than 49 wt % of the epoxy part.

4. The two-part adhesive composition according to claim 3 wherein the solid epoxy resin is present in an amount of greater than 26 wt % and less than 49 wt % of the epoxy part.

5. The two-part adhesive composition according to claim 3 wherein the solid epoxy resin and the core/shell rubber nanoparticles of the epoxy part B) are present in a combined amount of greater than 41.0% wt % and less than 69 wt % of the epoxy part.

6. The two-part adhesive composition according to claim 3 wherein the curative part A) and the epoxy part B) are provided in a mixing ratio such that when mixed, the solid epoxy resin and the core/shell rubber nanoparticles of A) and B) are present in a combined amount of greater than 26.0% wt % and less than 59 wt % of the two-part adhesive composition.

7. The two-part adhesive composition according to claim 3 wherein the solid epoxy resin is triglycidyl ether of trisphenol-methane.

8. The two-part adhesive composition according to claim 1 wherein the epoxy curative i) is an amine epoxy curative.

9. A cured material that results from mixing the curative part A) with the epoxy part B) of the two part-adhesive composition according to claim 1 and allowing cure.

* * * * *

UNITED STATES PATENT AND TRADEMARK OFFICE
CERTIFICATE OF CORRECTION

Page 1 of 1

PATENT NO. : 10,329,464 B2
APPLICATION NO. : 15/548922
DATED : June 25, 2019
INVENTOR(S) : Lianzhou Chen et al.

It is certified that error appears in the above-identified patent and that said Letters Patent is hereby corrected as shown below:

In the Specification

Column 7
Lines 23-25, delete "76. The two-part adhesive according to any of embodiments 1-7 5 wherein the epoxy curative is an amine epoxy curative." and insert the same on Line 24 as a new paragraph.

In the Claims

Column 14
Line 22, in Claim 6, delete "26.0%" and insert -- 26.0 --, therefor.

Signed and Sealed this
Twenty-seventh Day of August, 2019

Andrei Iancu
*Director of the United States Patent and Trademark Office*